No. 706,650. Patented Aug. 12, 1902.
C. P. GOERZ.
ASTIGMATICALLY CORRECTED WIDE ANGLE OBJECTIVE.
(Application filed Nov. 5, 1900.)
(No Model.)
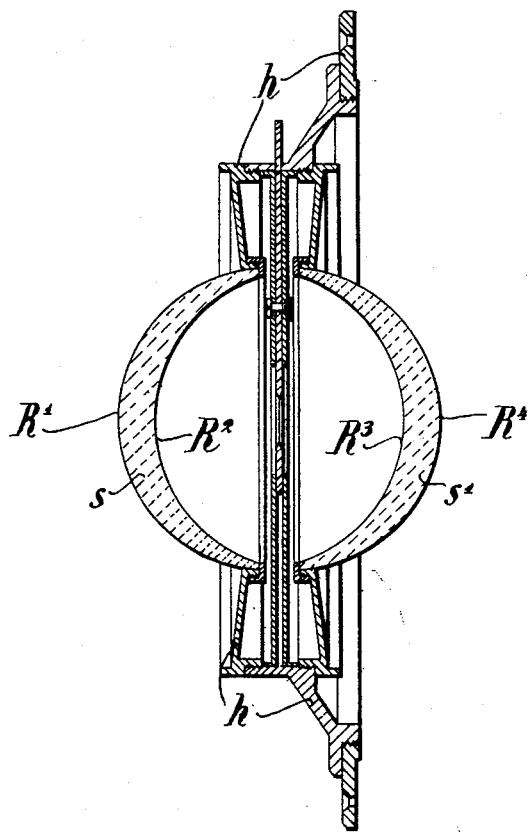
Witnesses:
Inventor:
Carl Paul Goerz.
by
Attorney

UNITED STATES PATENT OFFICE.

CARL PAUL GOERZ, OF FRIEDENAU, NEAR BERLIN, GERMANY.

ASTIGMATICALLY-CORRECTED WIDE-ANGLE OBJECTIVE.

SPECIFICATION forming part of Letters Patent No. 706,650, dated August 12, 1902.

Application filed November 5, 1900. Serial No. 35,552. (No model.)

*To all whom it may concern:*

Be it known that I, CARL PAUL GOERZ, a citizen of the Kingdom of Prussia, and a resident of Friedenau, near Berlin, Germany, (whose post-office address is Rheinstrasse 45/46a,) have invented certain new and useful Improvements in Astigmatically-Corrected Wide-Angle Objectives, of which the following is a specification.

The object of this invention is an astigmatically-corrected photographic objective for exposures under a very high angle of image. In this objective the correction of the spherical and chromatic aberration has been completely neglected in favor of a flat image free of the astigmatism of oblique rays and possessing a nearly unlimited extension. This new objective belongs to the class of spherical or globe objectives. All the constructions belonging to this class which are known to this day show strong aberrations from the anastigmatic aplanation and are available only for angles of image up to ninety degrees. Even in the case of the setting of the lenses and the effective aperture of the objective allowing rays to pass an angle of inclination toward the optical axis of more than forty-five degrees the astigmatic curves of the image show, nevertheless, that a distinct image cannot be produced, because of the rapid growth of the astigmatic differences.

Recent investigations (see the publications of E. von Hoegh in the *Archiv für Wissenschaftliche Photographie* II, part 4, page 86, Halle, 1900) have shown that the astigmatic aplanations of the plane of the image of narrow pencils of rays may be effected already in the simple meniscus for any direction of the rays. Thus it became known that with a lens of 6.09 millimeters thickness and an inclination of the chief pencil of rays toward the optical axis of thirty degrees a distinct anastigmatic aplanation of the image can be effected. On the contrary, for all the other rays (excepting those of no degrees of inclination toward the axis) there remained an astigmatism reaching a maximum between the axis and the corrected ray and increasing steadily beyond the latter. With an angle of image of ninety degrees the astigmatic defects are already strong enough to render the distinctness of the image insufficient. If, on the contrary, the astigmatic correction were effected for a higher angle of image, (ninety degrees, for instance,) the maximum of the astigmatic differences between the optical axis and the corrected chief ray would pass beyond the allowable limit of indistinctness and produce an unserviceable image. These so-called "intermediate" errors, therefore, limit the extension of the plane of the image in a nicely-defined degree. Now I have found by calculation that these intermediate errors possess certain relations with the thickness of the meniscus employed and grow smaller with the decreasing thickness. The new construction of a photographic objective is a result of these studies.

This construction is shown in a special form of execution in the accompanying drawing.

In the metal setting $h$ two menisci $s$ and $s'$ of calotte shape are arranged symmetrically. The concave and the convex surfaces of the menisci possess nearly equal radii of curvature, while the thickness of the lenses is very small.

For an objective of one hundred millimeters focal distance and having the following constants: $R'$ and $R^4$ (radii of curvature of the convex surfaces) equal 8.47132 millimeters; $R^2$ and $R^3$ (radii of curvature of the concave surfaces) equal 8.51034 millimeters; $d'$ and $d^2$ (greatest thickness of the lenses) equal 2.206 millimeters; $b'$ (half distance between the concave surfaces) equals 6.7961 millimeters; $^nG'$ (refractive index of the glass used for the lens relating to line $G'$ of the spectrum) equals 1.52053, the calculation, owing to the trifling thickness of the glass, will show such small results for the intermediate errors that no decrease of sharpness is noticed up to an angle of image of one hundred and thirty-five degrees. The chief ray intersecting the axis under an angle of fifty-three degrees will show an anastigmatic correction, while the astigmatic difference at its maximum between the middle part and the edge is only 0.133 millimeters and may be neglected accordingly. In the same way the astigmatic difference of a pencil of rays which leaves the lens under the practically-improbable angle of inclination of seventy-two degrees toward the axis will be not more than 0.641 millimeters. Moreover, the calculation shows that the refractive indices of the glass employed in the manufacture of the menisci exercise no practical influence upon the nature of the image produced. It is therefore advisable to employ a glass of the greatest possible purity and of a very low dispersive power, as the low thickness of the glass makes an achromatization impossible.

Having thus fully described the nature of my invention, what I claim is—

An astigmatically-corrected wide-angle objective for photographic purposes comprising two symmetrically-arranged menisci of very small thickness, said menisci having the form of hollow hemispheres, located with their concave sides toward each other, and having the radii of the convex and concave surfaces of substantially equal lengths; substantially as and for the purpose described.

In testimony whereof I affix my signature in presence of two witnesses.

CARL PAUL GOERZ.

Witnesses:
WOLDEMAR HAUPT,
HENRY HASPER.